United States Patent
Huang et al.

(10) Patent No.: US 9,261,627 B2
(45) Date of Patent: Feb. 16, 2016

(54) ZINC OXIDE ANTI-REFLECTION LAYER HAVING A SYRINGE-LIKE STRUCTURE AND METHOD FOR FABRICATING THE SAME

(75) Inventors: Kun-Ping Huang, Miaoli County (TW); Jr-Hau He, New Taipei (TW); Li-Ko Yeh, New Taipei (TW); Kun-Yu Lai, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 386 days.

(21) Appl. No.: 13/469,037

(22) Filed: May 10, 2012

(65) Prior Publication Data

US 2013/0129974 A1 May 23, 2013

(30) Foreign Application Priority Data

Nov. 18, 2011 (TW) .............................. 100142222 A

(51) Int. Cl.
| | | |
|---|---|---|
| *G02B 1/11* | (2015.01) | |
| *B05D 5/06* | (2006.01) | |
| *B32B 3/30* | (2006.01) | |
| *C23C 14/30* | (2006.01) | |
| *G02B 1/118* | (2015.01) | |
| *C23C 18/12* | (2006.01) | |

(52) U.S. Cl.
CPC .............. *G02B 1/118* (2013.01); *C23C 18/125* (2013.01); *C23C 18/1216* (2013.01); *C23C 18/1225* (2013.01); *C23C 18/1245* (2013.01); *C23C 18/1291* (2013.01); *Y10T 428/24355* (2015.01)

(58) Field of Classification Search
CPC ... G02B 1/118; C23C 18/1216; C23C 18/1291; C23C 18/125; C23C 18/1225; C23C 18/1245; Y10T 428/24355
USPC .......................................... 428/141; 359/601
See application file for complete search history.

(56) References Cited

U.S. PATENT DOCUMENTS

| 5,147,125 A | 9/1992 | Austin |
|---|---|---|
| 6,441,964 B1 | 8/2002 | Chu et al. |
| 2011/0123777 A1* | 5/2011 | Imaoku et al. ................ 428/172 |

FOREIGN PATENT DOCUMENTS

| CN | 1766677 | 5/2006 |
|---|---|---|
| CN | 101588021 | 11/2009 |
| CN | 102066987 | 5/2011 |
| WO | WO 2010032610 A1 * | 3/2010 |

OTHER PUBLICATIONS

L. E. Greene et al., "General Route to Vertical ZnO Nanowire Arrays Using Textured ZnO Seeds," Nano Letters 2005, pp. 1231-1236, vol. 5, No. 7, American Chemical Society, US.*

(Continued)

*Primary Examiner* — Laura Auer

(57) ABSTRACT

The disclosure provides a zinc oxide anti-reflection layer having a syringe-like structure and method for fabricating the same. The zinc oxide anti-reflection layer includes: a zinc oxide lower portion, wherein the zinc oxide lower portion has a nanorod array structure; and a zinc oxide upper portion connected to the zinc oxide lower portion, wherein the zinc oxide anti-reflection layer has a syringe-like structure.

18 Claims, 3 Drawing Sheets

(56) References Cited

OTHER PUBLICATIONS

Min Kyu Kim et al., "Tunable, Flexible Antireflection Layer of ZnO Nanowires Embedded in PDMS," Langmuir Article, Mar. 5, 2010, pp. 7552-7554, vol. 26, No. 10, American Chemical Society, US.

Yun-Ju Lee et al., "ZnO Nanostructures as Efficient Antireflection Layers in Solar Cells," Nano Letters, Apr. 17, 2008, pp. 1501-1505, vol. 8, No. 5, American Chemical Society, US.

Yongshu Tian et al.,"ZnO Pyramidal Arrays: Novel Functionality in Antireflection," J. Phys. Chem. C, May 14, 2010, pp. 10265-10269, vol. 114, American Chemical Society, US.

Li-Ko Yeh et al., "Giant Efficiency Enhancement of GaAs Solar Cells with Graded Antirefleciton Layers Based on Syringelike ZnO Nanorod Arrays," Advanced Energy Materials, Jul. 2011, pp. 506-510, vol. 1, Wiley, US.

\* cited by examiner

ZINC OXIDE ANTI-REFLECTION LAYER HAVING A SYRINGE-LIKE STRUCTURE AND METHOD FOR FABRICATING THE SAME

CROSS REFERENCE TO RELATED APPLICATIONS

This application claims priority of Taiwan Patent Application No. 100142222, filed on Nov. 18, 2011, the entirety of which is incorporated by reference herein.

BACKGROUND

1. Technical Field

The present disclosure relates to a zinc oxide layer, and in particular relates to a zinc oxide anti-reflection layer having a syringe-like structure and a method for fabricating the same.

2. Description of the Related Art

Development in the solar cell industry is driven by global environmental concerns and rising raw material prices.

In order to improve the incident light utilization efficiency and to prevent a reflection of the incident light, an anti-reflection layer formed on the surface of the solar cell is provided.

Zinc oxide is widely used as the anti-reflection layer, due to its excellent transparency and chemical stability. The fabrication methods for the zinc oxide include a vacuum process and a non-vacuum process. The instruments for the vacuum processes are expensive and the vacuum process is complicated and tedious. Thus, considerable attention has been attracted to utilizing the non-vacuum process.

Among the various non-vacuum processes, the hydrothermal process is the easiest and saves the most time. Zinc oxide anti-reflection layers formed by the hydrothermal process has been disclosed in several publications. However, growth stability of the zinc oxide is poor and the nano-geometric structures of the zinc oxide are limited by the conventional hydrothermal processes.

SUMMARY

The disclosure provides a zinc oxide anti-reflection layer having a syringe-like structure, comprising: a zinc oxide lower portion, wherein the zinc oxide lower portion has a nanorod array structure; and a zinc oxide upper portion connected to the zinc oxide lower portion, wherein the zinc oxide anti-reflection layer has a syringe-like structure.

The disclosure also provides a method for fabricating the zinc oxide anti-reflection layer having a syringe-like structure, comprising: (a) providing a substrate; (b) soaking the substrate in a first solution to conduct a first hydrothermal process to form a zinc oxide lower portion, wherein the first solution comprises a solution of zinc ions; (c) removing the substrate from the first solution: and (d) soaking the substrate in a second solution to conduct a second hydrothermal process to form a zinc oxide upper portion, wherein the second solution comprises a crystallization inhibitor, and the zinc oxide upper portion is connected to the zinc oxide lower portiona to form a syringe-like zinc oxide anti-reflection layer.

A detailed description is given in the following embodiments with reference to the accompanying drawings.

BRIEF DESCRIPTION OF THE DRAWING

For a more complete understanding of the present disclosure, and the advantages thereof, reference is now made to the following descriptions taken in conjunction with the accompanying drawings, in which.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1A:
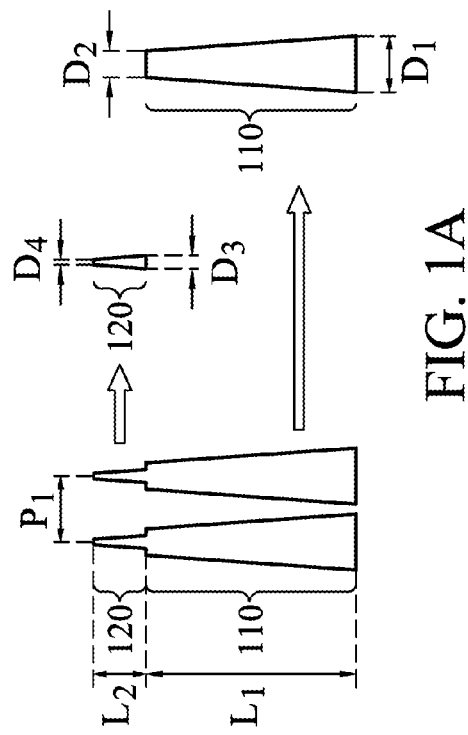
FIGS. 1A-1B show a series of cross-sectional schematic representation of the zinc oxide anti-reflection layer in accordance with an embodiment of the disclosure.

FIG. 1A shows a cross-sectional schematic representation of a zinc oxide anti-reflection layer having a syringe-like structure. For sake of simplicity, only two adjacent nanometer-scaled syringe-like structures have been shown in the FIG. 1A.

The zinc oxide antireflection layer comprises a zinc oxide lower portion 110 and a zinc oxide upper portion 120, wherein the zinc oxide lower portion 110 has a nanorod array structure and the zinc oxide upper portion 120 has a tip structure.

The zinc oxide lower portion 110 has a diameter of about 50-150 nm and it comprises a bottom portion with the $D_1$ diameter and a top portion with the $D_2$ diameter. The zinc oxide lower portion 110 has a diameter gradually decreasing from a bottom portion to a top portion ($D_1$ is larger than $D_2$).

The zinc oxide upper portion 120 has a diameter of about 1-40 nm and it comprises a bottom portion with the $D_3$ diameter and a top portion with the $D_4$ diameter. The zinc oxide lower portion 110 has a diameter gradually decreasing from a bottom portion to a top portion ($D_3$ is larger than $D_4$).

The zinc oxide lower portion 110 has a length $L_1$ of about 600-1000 nm, and the zinc oxide upper portion 120 has a length $L_2$ of about 100-300 nm, and a ratio of the length $L_1$ of the zinc oxide lower portion 110 to the length $L_2$ of the zinc oxide upper portion 120 is about 2/1-10/1 ($L_1/L_2$). Furthermore, the zinc oxide upper portion 120 has a pitch $P_1$ of about 50-500 nm, and preferably 200 nm.

Figure 1B:
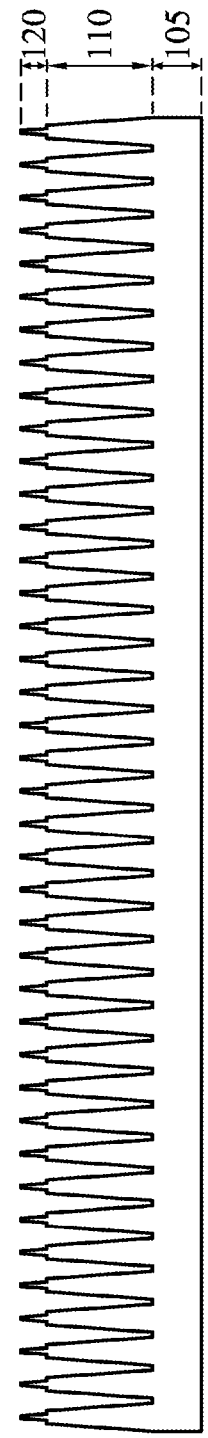

FIG. 1B shows a cross-sectional schematic representation of a zinc oxide anti-reflection layer. Beside the zinc oxide lower portion 110 and the zinc oxide upper portion 120, the zinc oxide anti-reflection layer further comprises a porous seed layer 105 formed below the zinc oxide lower portion 110. The advantage of the porous seed layer 105 is to form a nucleation position of a nano-zinc oxide seed layer to help the growth of the zinc oxide.

Note that a syringe-like structure of the zinc oxide is formed by combing the nanorod array structure of the zinc oxide lower portion 110 and tip structure of the zinc oxide upper portion 120. The syringe-like structure of the zinc oxide has a refractive index gradually decreasing from a zinc oxide lower portion to zinc oxide upper portion. Because of the gradually changed refractive index, the light trapping effect of the anti-reflection layer is better than that of the conventional zinc oxide.

From the above description, it is noted that the zinc oxide anti-reflection layer of the disclosure has an excellent anti-reflection property and thus it is very promising for usage in solar cells.

Additionally, the disclosure also provides a method for fabricating the zinc oxide anti-reflection layer. The method comprises step (a)-step (d). Firstly, in step (a), a substrate is provided and the substrate comprises glass, metal, alloy, a plastic substrate or a ceramic substrate.

Then, in step (b), the substrate is soaked in a first solution to conduct a first hydrothermal process to form a zinc oxide lower portion. The first solution comprises a solution of zinc ions and has a pH value of about 8-10. The first hydrothermal process is conducted at 85-99° C. for 0.5-3 hours.

In one embodiment, a zinc salt is dissolved in water to form the first solution. The zinc salt comprises zinc acetate, zinc phosphate, zinc nitrate or the like. In another embodiment, zinc nitrate ($Zn(NO_3)_2$) is dissolved in ammonia to form the first solution.

Furthermore, before conducting step (b), the method further comprises forming a seed layer on the substrate. The seed layer is formed by a spin coating process or E-gun evaporation process. The seed layer is helpful for the following growth of the zinc oxide.

In one embodiment, the seed layer of the zinc oxide is formed by an E-gun evaporation process, and the seed layer has a porous structure.

Then, the method continues to step (c), and the substrate is removed from the fist solution.

Then, in step (d), the substrate is soaked in a second solution to conduct a second hydrothermal process to form a zinc oxide upper portion. The second solution comprises a crystallization inhibitor and has a pH value of about 8-10. The zinc oxide upper portion with the tip structure is connected to the zinc oxide lower portion with the nanorod array structure to form a syringe-like zinc oxide anti-reflection layer In one embodiment, the zinc nitrite, vitamin C (as crystallization inhibitor) and hexamethylene tetraamine (HMTA) are dissolved in water to form the second solution.

The crystallization inhibitor comprises vitamin C, ammonium nitrate or L-ascorbic acid phosphate magnesium salt (APMg). The zinc oxide is more likely to grow along the [0001] orientation with the help of the crystallization inhibitor. Thus, the zinc oxide upper portion is thinner than the zinc oxide lower portion to form the syringe-like structure.

The second hydrothermal process is conducted at 85-99° C. for 0.5-2 hours. Additionally, a time interval between the first hydrothermal process and the second hydrothermal process is about 0.5-12 hours.

The zinc oxide anti-reflection layer may be used in various solar cells, such as a single crystalline silicon solar cell, polycrystalline silicon solar cell, silicon thin film solar cell, Group III-V solar cell, or CIGS thin film solar cell.

Figure 2:
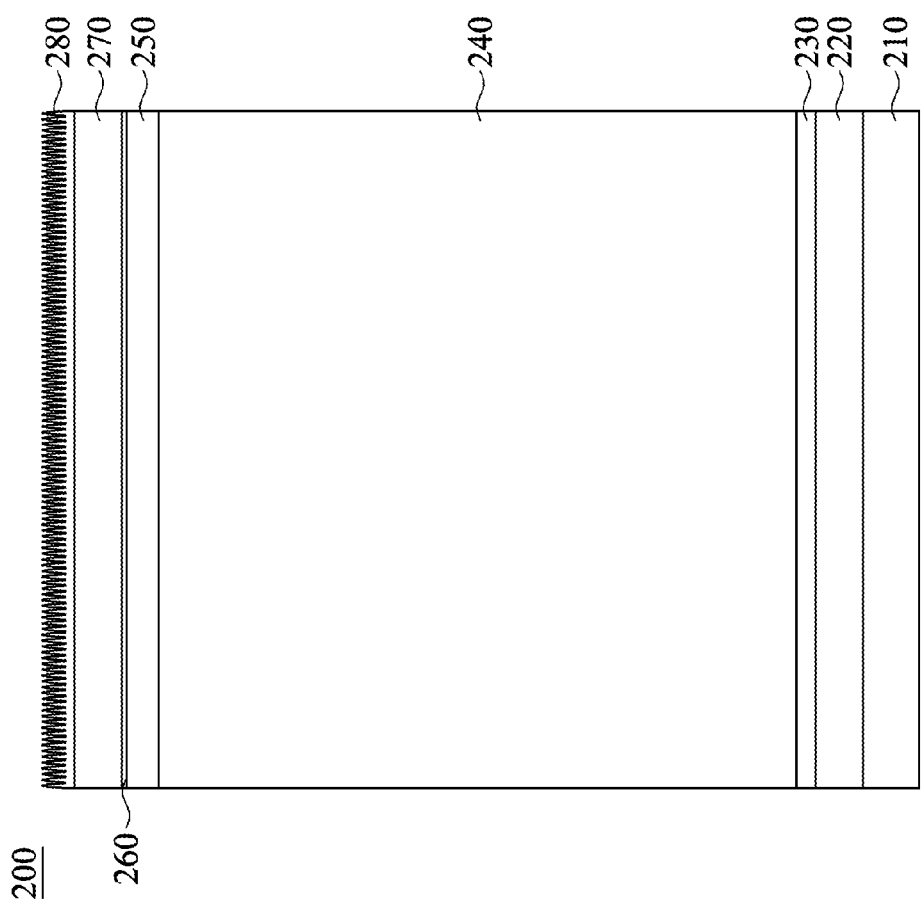
FIG. 2 is a cross-sectional schematic representation of the solar cell in accordance with an embodiment of the disclosure.

In one embodiment, referring to FIG. 2 which shows a cross-sectional schematic representation of the GaAs-based solar cell 200. The GaAs-based solar cell 200 comprises an n-type GaAs buffer layer 220, n-type GaAs window layer 230, n-type GaAs base layer 240, p-type GaAs emitter layer 250, p-type GaAs window layer 260, p-type GaAs contact layer 270 and anti-reflection layer 280 sequentially formed on a substrate 210, wherein the anti-reflection layer 280 is the zinc oxide with the syringe-like structure.

The experimental data shows that compared with the photoelectric conversion efficiency of a solar cell without an anti-reflection layer, the photoelectric conversion efficiency of a solar cell is significantly enhanced by up to 32% by using the syringe-like zinc oxide and 90 nm of the $Si_3N_4$ layer as the anti-reflection layer.

EXAMPLE

Example 1-6

A Zinc Oxide Anti-Reflection Layer Formed by a Hydrothermal Process (1) Forming Multi-Layers on a Substrate Referring to FIG. 2, 300 nm of a n-type GaAs buffer layer 220, 120 nm of an n-type GaAs window layer 230, 4000 nm of an n-type GaAs base layer 240, 200 nm of a p-type GaAs emitter layer 250, 30 nm of a p-type GaAs window layer 260 and 300 nm of a p-type GaAs contact layer 270 were sequentially formed on 350 nm of an n-type substrate 210.

(2) Forming a Seed Layer on the Multi-Layered Substrate.

A 5 mM zinc acetate solution ($Zn(CH_3COO)_2$, 0.219 g zinc acetate was dissolved in alcohol) was firstly fabricated. The zinc acetate solution was coated on the multi-layered substrate. Then, the substrate was put on a hot plate for heating at 300° C. for 25 minutes to form the seed layer on the p-type GaAs contact layer 270. Alternatively, 50 nm of the zinc oxide seed layer was formed on the p-type GaAs contact layer 270 by an E-gun evaporation process.

(3) Conducting a First Hydrothermal Process 2.97 g of zinc nitrate ($Zn(NO_3)_2$) was dissolved in 500 ml of water to form 20 mM of a zinc nitrate solution. Then, 150 ml of the zinc nitrate solution and 5 ml of a pure ammonia solution were added to 150 ml of deionizated water to form the first solution.

The substrate with the seed layer was soaked in the first solution at 90° C. to conduct the first hydrothermal process (at 300 rpm rotating speed). After 2 hours, the substrate was removed from the first solution and then was left at room temperature for 12 hours.

(4) Conducting a Second Hydrothermal Process 2.97 g of zinc nitrate ($Zn(NO_3)_2$) was dissolved in 500 ml of water to form 20 mM of a zinc nitrate solution. 1.402 g of hexamethylene tetraamine (HMTA) was dissolved in 500 ml of water to form 20 mM HMTA.

Then, 50 ml of a zinc nitrate solution (20 mM), 50 ml of an HMTA solution (20 mM), and 1 mg of vitamin C (5 mg/L) were added to 100 ml of deionized water to form the second solution.

The substrate was soaked in the second solution at 90° C. to conduct the second hydrothermal process (at 300 rpm rotating speed). After 0.5 hours, the substrate was removed from the second solution and an anti-reflection layer was formed on the seed layer of the substrate to form a solar cell.

Figure 3:
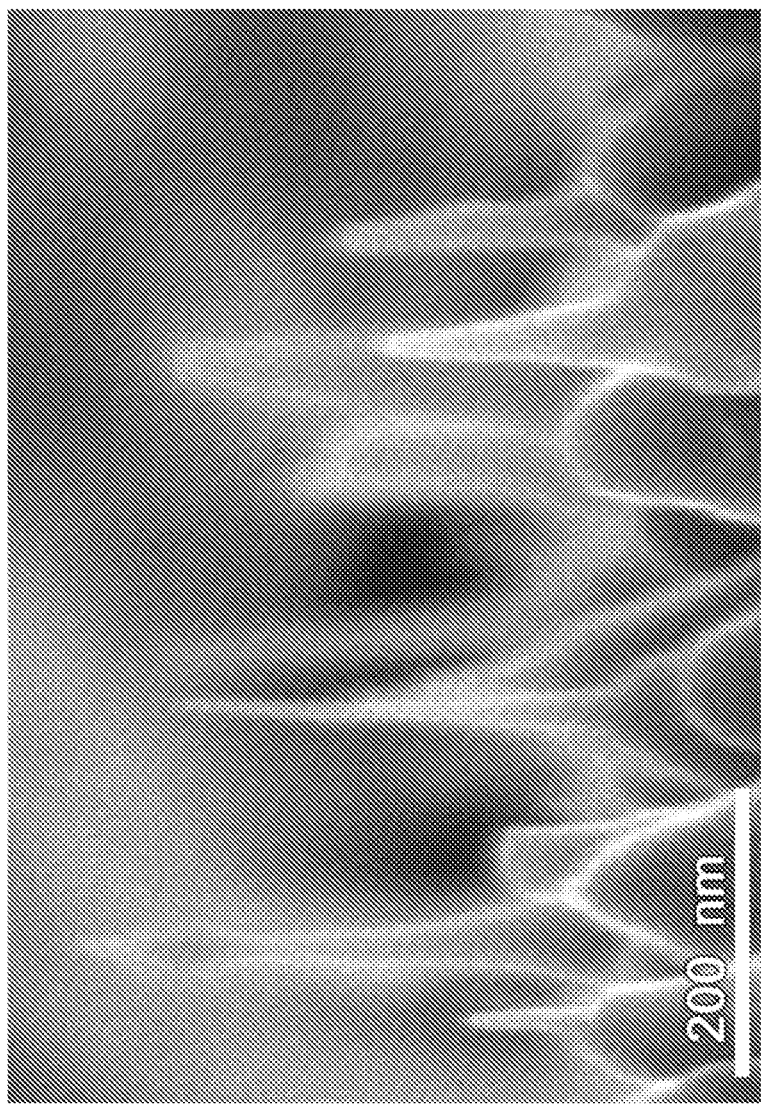
FIG. 3 is a scanning electron microscopy (SEM) image of the zinc oxide in accordance with an embodiment of the disclosure.

Referring to FIG. 3, which shows a scanning electron microscopy image of the zinc oxide of the Example 1. As shown in FIG. 1, the zinc oxide indeed has a syringe-like structure.

Example 2

The solar cell of the Example 2 was the same as that of the Example 1, except that an additional $Si_3N_4$ anti-reflection layer (90 nm) was formed before the syringe-like zinc oxide.

Comparative Example 1

The solar cell of the Comparative Example 1 was the same as that of the Example 1, except that no anti-reflection layer was formed in Comparative Example 1.

Comparative Example 2

The solar cell of the Comparative Example 2 was the same as that of the Example 1, except that an $Si_3N_4$ anti-reflection layer was formed in Comparative Example 2.

Table 1 shows the open-circuit voltage ($V_{oc}$), short-circuit current ($J_{sc}$), fill factor and photoelectric conversion efficiency ($\eta$) of Comparative Examples 1-2 and Examples 1-2. Compared with Comparative Example 1, the photoelectric conversion efficiency ($\eta$) of Example 1 was significantly enhanced by up to 24.9% (from 14.5% to 18.11%). Compared with Comparative Examples 1-2, the photoelectric conversion efficiency ($\eta$) of Example 2 was significantly enhanced by up to 37.2% (from 14.5% to 19.89%). Therefore, the syringe-like zinc oxide of the disclosure indeed had excellent anti-reflection property.

|  | $V_{oc}$ (V) | $J_{sc}$ (mA/cm$^2$) | F.F. | $\eta$ (%) |
|---|---|---|---|---|
| Comparative Example 1 (no anti-reflection layer) | 0.85 | 23.8 | 0.72 | 14.5 |
| Comparative Example 2 (Si$_3$N$_4$) | 0.88 | 24.7 | 0.74 | 16.1 |
| Example 1 (ZnO) | 0.87 | 25.07 | 0.80 | 18.11 |
| Example 2 (ZnO/Si$_3$N$_4$) | 0.86 | 28.39 | 0.81 | 19.89 |

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A zinc oxide anti-reflection layer having a syringe-like structure, comprising:
    a plurality of zinc oxide lower portions, wherein the zinc oxide lower portions have a nanorod array structure, wherein adjacent zinc oxide lower portions are spaced apart from each other; and
    a plurality of zinc oxide upper portions, each connected to one of the plurality of zinc oxide lower portions to form a syringe-like structure;
    wherein each of the zinc oxide lower portions has a diameter gradually decreasing from bottom to top, and each of the zinc oxide upper portions has a diameter gradually decreasing from bottom to top, and wherein a step is formed between each zinc oxide upper portion and zinc oxide lower portion.

2. The zinc oxide anti-reflection layer having a syringe-like structure as claimed in claim 1, wherein each of the zinc oxide upper portions has a tip structure.

3. The zinc oxide anti-reflection layer having a syringe-like structure as claimed in claim 1, wherein a ratio of a length of the zinc oxide lower portion to that of the zincoxide upper portion is about 2/1-10/1.

4. The zinc oxide anti-reflection layer having a syringe-like structure as claimed in claim 1, wherein each of the zinc oxide upper portions has a length in a range of 100-300 nm, and each of the zinc oxide lower portions has a length in a range of 600-1000 nm.

5. The zinc oxide anti-reflection layer having a syringe-like structure as claimed in claim 1, wherein each of the zinc oxide upper portions has a diameter in a range of 1-40 nm, and each of the zinc oxide lower portions has a diameter in a range of 50-150 nm.

6. The zinc oxide anti-reflection layer having a syringe-like structure as claimed in claim 1, wherein the zinc oxide upper portions have a pitch in a range of 50-500 nm.

7. The zinc oxide anti-reflection layer having a syringe-like structure as claimed in claim 1, further comprising a porous seed layer formed below the zinc oxide lower portion.

8. The zinc oxide anti-reflection layer having a syringe-like structure as claimed in claim 1, wherein the zinc oxide anti-reflection layer has a refractive index gradually decreasing from the zinc oxide lower portion to the zinc oxide upper portion.

9. A method for fabricating the zinc oxide anti-reflection layer having a syringe-like structure of claim 1, comprising:
    (a) providing a substrate;
    (b) soaking the substrate in a first solution to conduct a first hydrothermal process to form a zinc oxide lower portion, wherein the first solution comprises a solution of zinc ions;
    (c) removing the substrate from the first solution: and
    (d) soaking the substrate in a second solution to conduct a second hydrothermal process to form a zinc oxide upper portion, wherein the second solution comprises a crystallization inhibitor, and the zinc oxide upper portion is connected to the zinc oxide lower portion to form a syringe-like zinc oxide anti-reflection layer, wherein a step is formed between the zinc oxide upper portion and the zinc oxide lower portion.

10. The method for fabricating the zinc oxide anti-reflection layer having a syringe-like structure as claimed in claim 9, wherein the substrate comprises glass, metal, alloy, a plastic substrate or a ceramic substrate.

11. The method for fabricating the zinc oxide anti-reflection layer having a syringe-like structure as claimed in claim 9, wherein the crystallization inhibitor comprises vitamin C, ammonium nitrate or L-ascorbic acid phosphate magnesium salt (APMg).

12. The method for fabricating the zinc oxide anti-reflection layer having a syringe-like structure as claimed in claim 9, before the first hydrothermal process, further comprising forming a seed layer on the substrate.

13. The method for fabricating the zinc oxide anti-reflection layer having a syringe-like structure as claimed in claim 12, wherein the seed layer is formed by a spin coating process or an E-gun evaporation process.

14. The method for fabricating the zinc oxide anti-reflection layer having a syringe-like structure as claimed in claim 9, wherein a time interval between the first hydrothermal process and the second hydrothermal process is about 0.5-12 hours.

15. The method for fabricating the zinc oxide anti-reflection layer having a syringe-like structure as claimed in claim 9, wherein the first solution has a pH value of about 8-10, and the second solution has a pH value of about 8-10.

16. The method for fabricating the zinc oxide anti-reflection layer having a syringe-like structure as claimed in claim 9, wherein the first hydrothermal process is conducted at 85-99° C., and the second hydrothermal process is conducted at 85-99° C.

17. The method for fabricating the zinc oxide anti-reflection layer having a syringe-like structure as claimed in claim 9, wherein the first hydrothermal process is conducted for 0.5-3 hours, and the second hydrothermal process is conducted for 0.5-2 hours.

18. The zinc oxide anti-reflection layer having a syringe-like structure as claimed in claim 1, wherein a diameter of a bottom of the zinc oxide upper portions at the step is smaller than a diameter of a top of zinc oxide lower portions at the step.

* * * * *